UNITED STATES PATENT OFFICE.

THOMAS J. ROBBINS, OF MIDDLETOWN, CALIFORNIA, ASSIGNOR OF ONE-HALF OF HIS RIGHT TO WILLIAM CASTLE, OF SAME PLACE.

MEDICAL COMPOUND.

SPECIFICATION forming part of Letters Patent No. 224,954, dated February 24, 1880.

Application filed October 28, 1879.

*To all whom it may concern:*

Be it known that I, THOMAS J. ROBBINS, of Middletown, county of Lake, and State of California, have invented a Medical Compound for Skin Diseases; and I hereby declare the following to be a full, clear, and exact description thereof.

My invention relates to a novel medical compound for the treatment of skin diseases; and it consists in a combination of a strong decoction of manzanita-leaves and the bark of the fir (*Pinus sabiniana*) with sufficient alcohol to preserve it.

In the preparation of my compound, I take the leaves of what is known as the "manzanita" and bruise or crush them, after which they are placed in a vessel with water. I also take the bark of the fir (*Pinus sabiniana*) and treat it in a similar manner and place it in the same vessel with the leaves. The whole is then boiled until a strong decoction is made of equal parts of each of the ingredients, and the liquid thus produced is boiled down until it is of a consistency about as thick as mucilage. I then add to this alcohol, in about the proportion of one part of alcohol to about eight or ten parts of the mixture, thus preserving it, so that it may be kept for any length of time.

This compound is valuable for external application for the cure of corns, chilblains, burns, skin diseases, and poison from what is known as "poison-oak," when applied to human beings, and for collar gall or sore back in horses. It is simply to be applied freely to the affected part two or three times a day.

Having thus described my invention, what I claim as new, and desire to secure by Letters Patent, is—

The decoction or extract above described, consisting of equal parts of manzanita-leaves and the bark of the fir-tree, (*Pinus sabiniana*,) boiled in water and preserved by the addition of alcohol, as set forth.

In witness whereof I have hereunto set my hand.

T. J. ROBBINS.

Witnesses:
   S. H. NOURSE,
   FRANK A. BROOKS.